June 17, 1969  C. E. BROWN  3,450,601
AMBIENT TEMPERATURE VAPOR COMPRESSION DESALINATION SYSTEM
Filed April 4, 1967

INVENTOR
CLINTON E. BROWN

BY *Robillard and Byrne*
ATTORNEYS

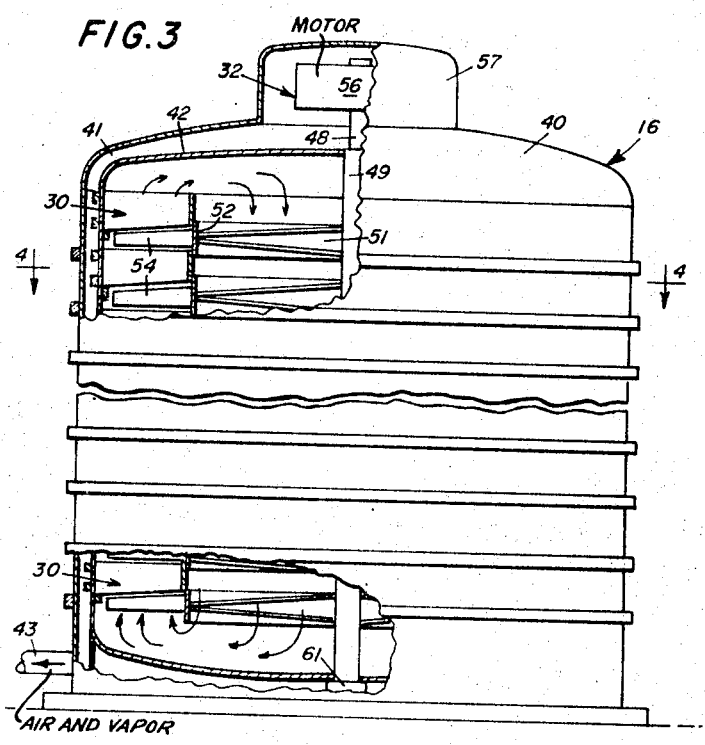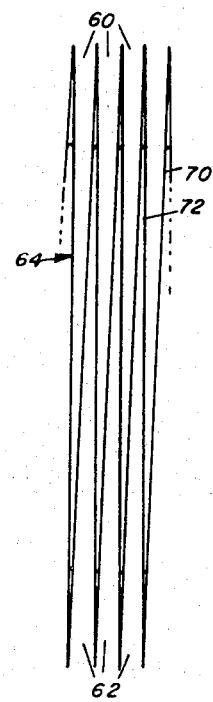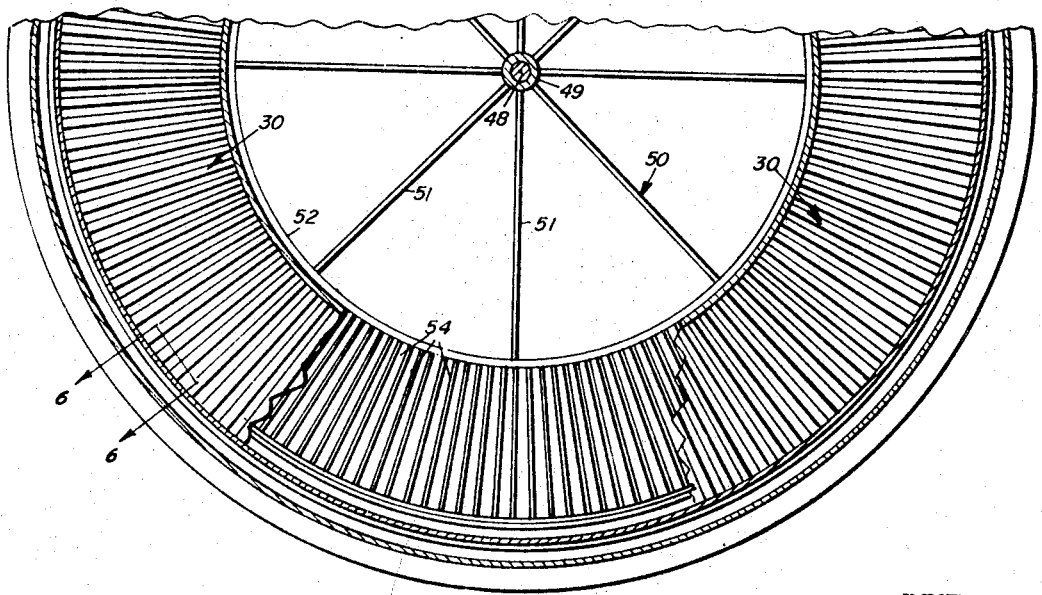

INVENTOR
CLINTON E. BROWN

United States Patent Office 3,450,601
Patented June 17, 1969

3,450,601
AMBIENT TEMPERATURE VAPOR COMPRESSION DESALINATION SYSTEM
Clinton E. Brown, Silver Spring, Md., assignor to Hydronautics, Inc., Laurel, Md., a corporation of Maryland
Filed Apr. 4, 1967, Ser. No. 628,498
Int. Cl. B01d 3/10, 1/26
U.S. Cl. 202—174
10 Claims

ABSTRACT OF THE DISCLOSURE

Means for preparing a treated liquid having a desired pH by adding sulfuric acid to saline water and deaerating and filtering to substantially eliminate the carbonates. Thereafter distilling the treated liquid in a distilling apparatus adapted to handle treated liquids having the desired pH, and including a plurality of annular horizontally arranged falling film heat exchange units, the units being vertically spaced to provide pressurizing compartments therebetween which receives the blades of a rotary compressor, the compressor being the only movable part in the apparatus.

---

The invention described herein relates to a method for converting saline water at approximately ambient temperature into fresh water, and wherein the vapor compression factor required is only that which is necessary to raise the vapor pressure of the feed water at ambient temperature to that of fresh water at the same temperature; the latent heat of condensation maintaining the process in heat balance and continuous operation. It should be recognized that ambient temperature, as used herein, includes minor variations due to the processing as distinguished from intentional heat changes obtained by using a liquid-heat exchanger, such a heat exchanger not being required.

More specifically the invention contemplates the treatment of saline water at ambient temperature by acidifying, deaerating and filtering to produce a treated liquid having a desired pH and thereafter distilling the treated liquid.

Additionally there is provided a distilling apparatus particularly adapted for use with such a treated liquid and wherein a plurality of annular horizontally arranged falling film type heat exchangers are used, the exchangers being vertically spaced to provide pressure compartments therebetween in which the pressurizing means operate. The pressurizing means are the only movable part within the distilling apparatus and thus simplicity of fabrication, maintenance and repair is achieved.

The foregoing and other objects and advantages will be fully understood by reference to the following description when read in light of the accompanying drawings, wherein like numerals refer to like parts in the several figures.

Figure 1:
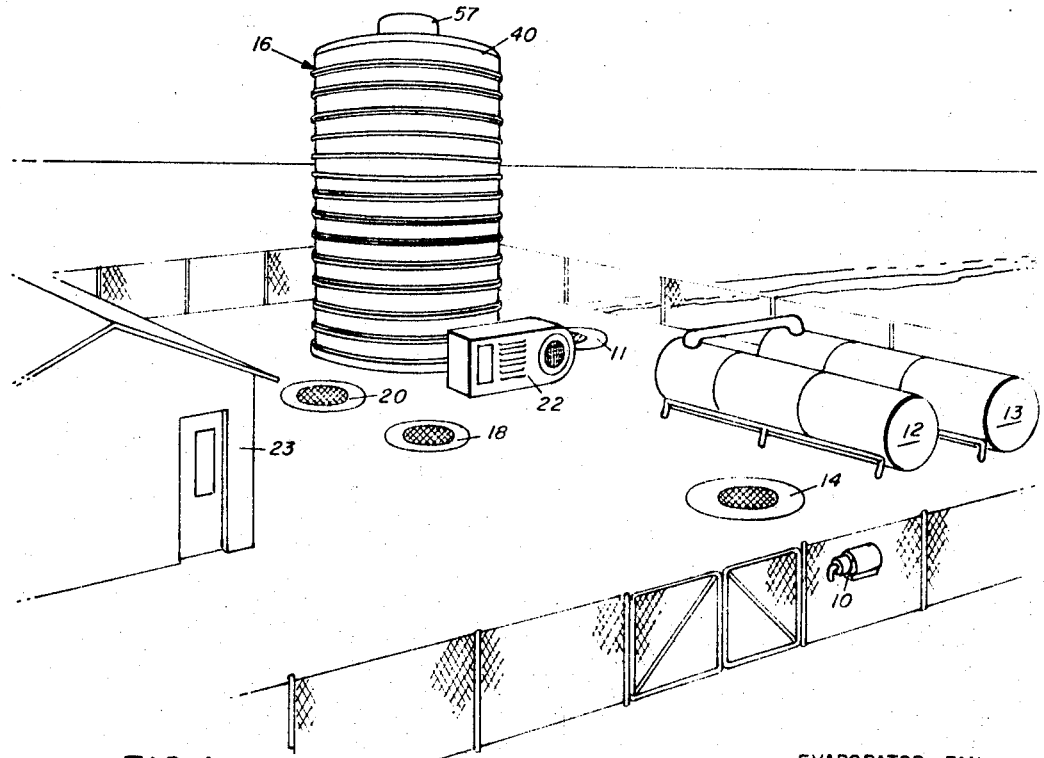
Figure 2:
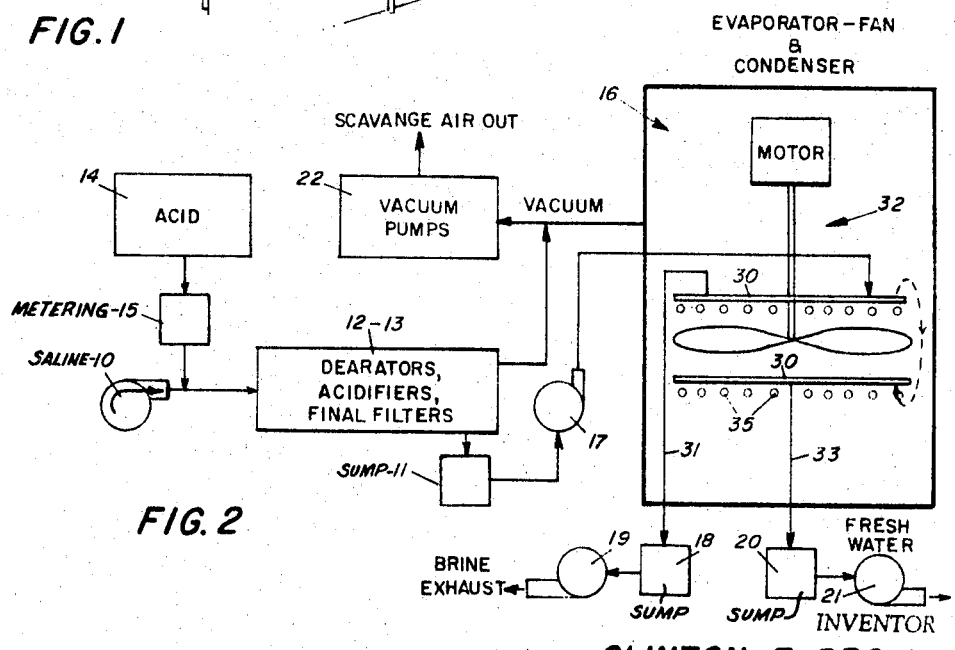
Figure 6:
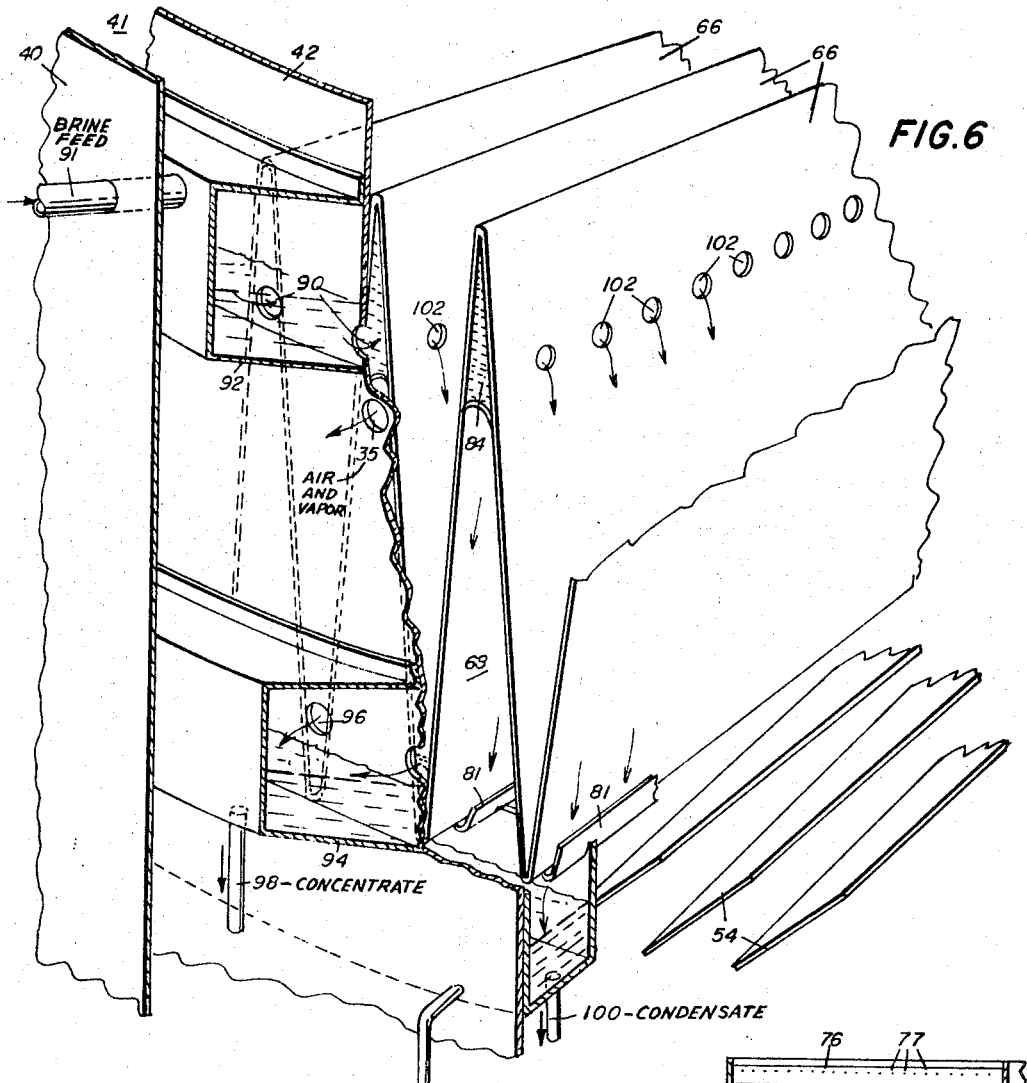
Figure 8:
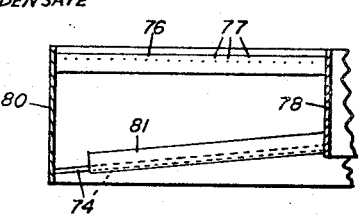
Figure 7:
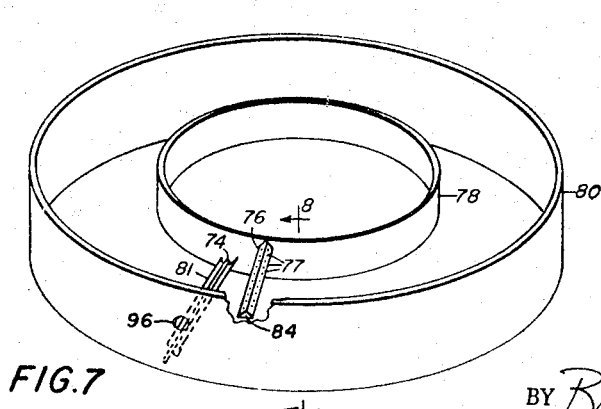

FIGURE 1 is a perspective view of the system described herein;
FIGURE 2 is a schematic view of the system;
FIGURE 3 is a side elevation partly in section of the tower within which the distilling apparatus is enclosed;
FIGURE 4 is a view taken on the line 4—4 of FIGURE 3;
FIGURE 5 is a view illustrating the serpentine pattern of the thin layer structure of the heat exchanger units;
FIGURE 6 is a detailed perspective taken generally on the line 6—6 of FIGURE 4 with parts broken away to show a heat exchanging unit and the associated liquid feed and take off means;
FIGURE 7 is a perspective of the supporting frame for the thin layer structure heat exchanging unit; and FIGURE 8 is a view taken on line 8—8 of FIGURE 7.

Referring to FIGURES 1 and 2 the system includes a pump 10 for feeding the saline water at ambient temperature to the treating tank 12. As the sea water is pumped to the treating tank, sulfuric acid is added from the acid storage 14, through any suitable type of metering means 15.

The sea water contains carbon and approximately 80 to 95% of the carbon is in the form of bicarbonate ions, and the sulfuric acid is added to eliminate the carbonates. For each mole of $CO_3$ there is required from .525 to .6 mole of $H_2SO_4$ to eliminate the carbonate from solution. As the solubility limit of $CaCO_3$ in a salt solution is approximately 75 p.p.m. by weight at 47° F., and the sea water initially contains approximately 120 p.p.m., a large fraction of the carbonates must be removed to secure scale free operation. Therefore, before concentrating by a factor of two, the feed water must contain more than 37 p.p.m. calcium carbonate, and approximately 70% of the initial carbonate must be removed. This requires .42 mole of acid per initial mole of $CO_3$, amounting to approximately half a pound of concentrated sulfuric acid for each thousand gallons of the saline feed water.

In order to remove the released gases resulting from the chemical reaction, the tank 12 is maintained at subatmospheric pressure by the scavenger pump 22, the vacuum required being slightly lower than the vapor pressure of the sea water, or at approximately 7.6 mm. of Hg at 47° F. The liquid from tank 12 then passes to tank 13 where it is filtered through diatomaceous earth to remove any carried over solids. The resultant treated liquid now has a pH of 7.5 to 8.4 and it is collected in a suitable sump 11.

Treated liquid from sump 11 is fed by pump 17 to the upper or evaporator surface of a plurality of heat exchanger units 30, diagrammatically shown in FIGURE 2 as thin flat layer structures having high thermal conductivity. The resultant vapors rise from the upper evaporator surfaces and the residue flows off through a conduit 31. Positioned between each pair of units 30 is a rotary compressor 32 which pressurizes the rising vapors and transfers them to the bottom condensing surfaces of the thin layer structure. As the units 30 are vertically stacked, the vapor from the uppermost evaporator surface is recirculated, as indicated by the dotted line in FIGURE 2, to the lowermost condensing surface (the lowermost rotary compressor not being shown) and the condensate is drawn off through a conduit 33. The residue from the conduit 31 flows to a pump 18 from which it may be discharged by a pump 19, and the fresh water flows to a sump 20 from which it may be discharged by a pump 21.

Initially the distilling apparatus must be deaerated to reduce the air concentration in the condensing compartment to approximately $10^{-6}$ pounds of air per pound of water, thereby removing two hundred parts of steam per part of air which results in a vapor loss of two hundredths of one per cent, for a system producing $10^6$ gallons per day. The apparatus is continuously evacuated through the openings 35 positioned just below each of condensing surfaces in FIGURE 2.

Once evacuated, the vapor cycle with the sea water at 47° F. requires that the vapor pressure (.155 p.s.i.) be raised by the compressor means 32 to the vapor pressure of fresh water (.158 p.s.i.) at the same temperature. At this pressure the vapor will condense, and as previously stated the latent heat of evaporation will assure continuous operation. The ideal or minimum work required of the compressor will be the product of pressure rise times the volume of vapor pumped and in the example given will be 820 ft. lbs./lb.

From the foregoing the method can be generally described as the product of a treated liquid having a pH between approximately 7.5 and 8.4 by acidifying with sulfuric acid, deaerating and filtering sea water at ambient temperature. The treated liquid is then pressurized to increase the vapor pressure from that of the treated liquid at ambient temperature to that of fresh water at the same temperature whereupon condensation will result.

Referring now to the tower 16, it includes an air-tight outer housing 40 completely enclosing the distilling apparatus which includes an air casing 42 of lesser diameter than the housing 40, providing therebetween an annular chamber 41. As the system may be used in remote areas the provision of an outer housing enclosing distilling apparatus is preferred, in that the outer housing 40 may be fabricated with sufficient strength to withstand all weather conditions. The enclosed casing 42 may then be fabricated from suitable non-corrosive materials such as plastics, thereby reducing the cost of manufacture. The annular chamber 41 also serves as a manifold which may be evacuated in order to evacuate the condensing compartments as hereinafter described, and further serves to insulate the casing 42 from exterior changes in temperature.

The casing 42 houses the heat exchanger units 30 which in the embodiment shown are twelve in number. The outer circumferential wall of the heat exchanger units 30 have the same outside diameter as the inner diameter of casing 42, whereas the inner wall is of lesser diameter than the casing. The heat exchanger units 30 are preferably prefabricated as a unitary structure, and as seen in FIGURES 7 and 8 include a supporting frame having an outer circumferential end wall 80 and an inner circumferential end wall 78. The walls 78 and 80 are joined by lower and upper circumferentially spaced connectors 74 and 76, only two of which are shown in FIGURE 7. Also as seen in FIGURE 7 the connector 76 interconnects the end walls adjacent the top rim thereof, whereas the connector 74 connects the end walls adjacent the bottom rim thereof. The connectors are sufficient in number to support a thin layer structure 64 (FIGURE 5) having high thermal conductivity and which is wound in a serpertine pattern over and under the frame connectors. The thin layer structure herein is of a material having high corrosive resistance, preferably titanium, thus assuring long life expectancy. The thickness of the layer 64 is preferably 3 mils. Other corrosion resistant materials may be used, such as Monel 400, but the life expectancy would be less than that of titanium.

With the heat exchanger units so constructed, there is provided (FIGURES 5 and 6) a plurality of upperwardly facing V-shaped evaporator compartments 60 and alternate downwardly facing V-shaped condensing compartments 62 having a first series of sidewall members 70 extending downwardly and inclined slightly from the vertical in one direction and a second series of sidewall members 72 extending downwardly and inclined slightly from the vertical in the opposite direction. The first and second series of sidewall members are alternately arranged relative to one another and joined at the apexes to form the V-shaped evaporator compartments. Preferably the thin layer structure 64 is a continuous strip, although it could be a plurality of interjoined sections. It should be recognized that the illustration of the heat exchanger units in FIGURES 5 and 6, and particularly the inclination of the respective sidewalls is exaggerated for purposes of clarity.

Referring back to FIGURE 7, the upper connector 76 is in the form of an isosceles triangle and constitutes a radially extending supply duct for the feed liquid to the evaporator compartments as indicated by 84 in FIGURE 6. The connector is provided lengthwise with a plurality of small openings 77, which align with the openings 102 of the thin layer structure (FIGURE 6) whereby the liquid will feed out onto the evaporator walls and descend in a falling film. Again, the openings 102 are exaggerated in size as they would be miniscule to assure a falling film. With the heat exchanger unit positioned as shown in FIGURE 6, the casing 42 is provided with openings 90 at each of the feed ducts 84, and with openings 96 adjacent the bottom of each evaporoator compartment to permit the residue to drain from the compartment. The feed liquid is supplied from a manifold 92 secured to the outside surface of the casing 42 within the annular chamber 41, the feed water being supplied thereto from the conduit 91. A similar manifold 94 is positioned to receive the residue from the evaporator compartment through the casing openings 96, the residue flowing off through the conduit 98. Similar feed and residue manifolds are associated with each of the heat exchanger units.

Positioned within the casing 42 and located in the spacing between each of the heat exchanger units is an open-top trough 100 for receiving the fresh water from the condensing compartments. Also associated with each of the condensing compartments is a radially extending receiving channel 81, which as seen in FIGURE 7, underlies the lower supporting rod 74 and extends outwardly from the inner wall 78 and terminates short of the outer wall to drain into the receiving trough 100. The angle of the compartment walls and the width of the receiving channel 81 must be such that the condensate collects within the channel.

As earlier stated, the steam must be evacuated and this is accomplished by providing openings 35 through the casing 42 adjacent the apex of each condensing compartment. When the distilling unit is not within the outer shell 40, a manifold similar to manifold 92 could be provided for evacuating purposes. However, in the embodiment shown the chamber 41 functions as the manifold, the chamber having a conduit 43 leading from (FIGURE 3) the bottom thereof to the scavenging pump 22.

Centrally located within the casing 42 is the vertical drive shaft 48 of the compressor means 32, the drive shaft being supported at its lower end in a bearing 61, and its upper end extends through a suitable bushing in casing 42 and connects to a drive means, such as an electric motor 56, positioned within the dome 57 of the tower 16.

Carried by the drive shaft 49 are a plurality of rotors 50 equal in number to the heat exchanger units. Each rotor includes a plurality of radial arms 51 carrying at their outer ends a blade carrier 52. Extending radially outward from the blade carriers are blades 54, which are positioned within the spacing between each of the heat exchanger units 30. As best seen in FIGURE 3, the blade carrier 52 is a cylindrical member of sufficient width that it overlaps the inner wall structure of each adjacent heat exchanger unit, with only enough clearance therebetween to permit free rotation of the carrier. With this arrangement the inner wall member 78 of the successive heat exchanger units and the successive carriers 52 provide an inner cylindrical barrier of less height than casing 42, the barrier having alternate fixed and movable surfaces and also define with casing 42 the pressure compartments between the heat exchanger units in which the blades operate. Because the heat exchanger units are stacked vertically, the lowermost rotor is positioned beneath the lowermost unit 30, and as the barrier functions to define a central passage, the vapors arising from the uppermost evaporator compartments are drawn downwardly through the passage to the lowermost condensing compartments.

As best seen in FIGURE 6 the blade members 54 are inclined to the vertical and function to pressurize the vapors rising from each evaporating compartment and transfer the vapors to the condensing compartment overlying the pressure chamber. However, as the vapors tend to rise vertically, the amount of work required of the compressor to transfer the vapors is reduced to a minimum. As can now be clearly seen, the only movable part within the distilling apparatus is the rotary compressor 32.

The preferred embodiment has been described, but it should be clear from the description that the distilling apparatus 42 could be used within any suitable enclosure.

If the locality is such that a building could be erected, the outer casing 40 could be eliminated and a manifold associated with each of the units for evacuating the condensing compartments. It is likewise apparent that the outer wall member 80 of the heat exchanger units (FIGURE 7) could be eliminated and the inner connecting members 74, 77 secured to casing 42. However, from a practical standpoint, the fabrication of the unit in the manner described is preferred, inasmuch as the thin layer structure 64 requires 185,000 square feet for a unit producing $10^{-6}$ gallons per day, and the mounting of the layer structure onto the frame, prior to installation within the casing 42, is much simpler than doing it within the casing.

It should be also recognized that the preferred embodiment of the distilling apparatus is shown for processing of the treated liquid described herein; and for liquids where corrosion is not a major factor, less costly materials may be used.

Well-known control means may be included such as electrical float or other type switches responsive to the water levels in the feed manifolds as well as such other controls which may be deemed advisable.

The following is claimed:

1. A distilling apparatus of the type described including:
   (a) an annular air-tight cylindrical, vertical casing,
   (b) an annular inner concentric barrier within the casing, the barrier being of lesser height than the casing and having alternate, coaxial fixed and rotary cylinders.
   (c) a plurality of annular undulating coaxial, transversely disposed vertically spaced heat exchanger units having upwardly facing evaporator compartments and downwardly facing condensing compartments in the casing, each unit being supported between the casing and the fixed cylinder of the inner barrier,
   (d) a plurality of pressurizing blades carried exteriorly by each rotary cylinder of the barrier and extending into the spacing between the heat exchanger units, and
   (e) means for rotating the movable cylinders of the barrier about their vertical axis.

2. The apparatus defined in claim 1 wherein the compartments are defined by a thin layer structure of high thermal conductivity.

3. The apparatus defined in claim 2 wherein said thin layer structure is titanium having a thickness of 3 mils.

4. The apparatus defined in claim 2 wherein each heat exchanger unit has associated therewith a first means for supplying liquid to the top of each evaporator compartment, a second means for receiving residue from the bottom of each evaporator compartment, a third means for evacuating each condensing compartment, and a fourth means for receiving condensate.

5. The apparatus defined in claim 4 wherein each of said first three means is an annular manifold on the exterior wall of the casing and said fourth means is an annular trough on the enterior wall of the casing.

6. The apparatus defined in claim 5 wherein the manifold for evacuating the condensing compartments is an outer air-tight housing completely enclosing the annular casing.

7. A heat exchanger unit comprising an inner annular wall member, and outer concentric annular wall member, alternate top and bottom interconnecting strut-like members adjacent the top and bottom edges of the wall members, and a thin-layer structure of high heat conductivity extending from each upper connecting member downwardly and angularly to each lower connecting member to define alternate upwardly facing evaporator compartments and downwardly facing condensing compartments.

8. The unit defined in claim 7 wherein the top connecting members are hollow and provided with openings along their length, and said layer structure is provided with openings aligned with the connecting member openings.

9. The unit defined in claim 7 including a condensate receiving channel member underlying each bottom connecting member.

10. The unit defined in claim 7 wherein the thin layer structure is a continuous sheet serpentine wound over and under the connecting members.

References Cited

UNITED STATES PATENTS

| | | | |
|---|---|---|---|
| 3,211,633 | 10/1965 | Hammer et al. | 202—236 |
| 1,862,069 | 6/1932 | Subkow | 202—91 X |
| 2,313,175 | 3/1943 | Scott et al. | 203—89 |
| 2,924,292 | 2/1960 | Hickman | 202—182 |
| 2,999,796 | 9/1961 | Bromley | 159—28 X |
| 3,136,707 | 6/1964 | Hickman | 203—89 X |
| 3,218,241 | 11/1965 | Checkovich | 203—11 X |
| 3,282,797 | 11/1966 | Hammer | 203—11 X |

OTHER REFERENCES

"Multiple Effect Rotating Evaporator," Chemical Eng. Progress, January 1961, pp. 64–70, by Richard L. Clark and LeRoy A. Bromley.

NORMAN YUDKOFF, *Primary Examiner.*

J. SOFER, *Assistant Examiner.*

U.S. Cl. X.R.

159—18; 202—187, 236, 238; 203—7, 26